UNITED STATES PATENT OFFICE.

CHARLES ANTOINE HEUDEBERT, OF NANTERRE, FRANCE.

MANUFACTURE OF BREAD.

950,921.        Specification of Letters Patent.        Patented Mar. 1, 1910.

No Drawing.      Application filed January 21, 1903. Serial No. 139,890.

*To all whom it may concern:*

Be it known that I, CHARLES ANTOINE HEUDEBERT, of 3 Rue du Chemin de Fer, Nanterre, Seine, Republic of France, baker, have invented Improvements in the Manufacture of Bread, of which the following is a full, clear, and exact description.

This invention relates to a novel gluten bread, very rich in nitrogenized substances produced by the incorporation of a soluble casein obtained from milk.

It is well known that for diabetic persons food almost completely nitrogenized is the desideratum; the food should contain a minimum of sugar, dextrin, starch, which are termed carbo-hydrates. Bread manufactured especially for persons affected with this complaint does however contain considerable traces of these substances and in addition its taste is usually somewhat disagreeable so that a diet of this character is unpleasant.

The bread made according to this process shows upon analysis the small proportion of 16.5% starch, which is the indispensable minimum for panification; in addition to this it is of agreeable taste such as is unattainable in the ordinary way.

The bread consists of the following substances: 1. Gluten 96% pure. 2. A casein rendered soluble, in the proportion of 150 grams for 500 grams of gluten. 3. Water in the proportion of 250 grams, 20 grams of salt and 25 of yeast, the whole for 500 grams of pure gluten. The water is warmed and the soluble casein is added thereto while stirring gently with a spoon until the substance is dissolved. Salt is added while still stirring and when this has been done the mixture is permitted to cool. When the solution is almost cold, the yeast is crumbled in and caused to dissolve in the same manner by stirring. Panification is then effected, gluten flour being mixed with the liquid to form a dough. This operation should be delicately effected so that the mixing may be perfect.

The dough produced by the present process is allowed to ferment for one hour; the dough is then cut up into pieces of from 100 to 150 grams according to the size of loaf desired and then rolled up into sticks. These loaves should be baked in a mold in order to effect perfect baking and expel moisture so that the bread may be kept indefinitely. These molds are about 30 centimeters in length, 3½ centimeters high and 3½ centimeters wide. The loaves are allowed to stand for about 1½ hour before being placed in the oven. The baking temperature should be about 150° C. and the baking should last about one hour. When the loaves have been removed from their molds they are placed in a stove or drying chamber regulated to 100° C., and there left for about six hours. The bread thus constituted contains about 60% of nitrogenized substances and 1.23% phosphoric acid. The proportion of carbo-hydrates is very small (16.50%) just the minimum necessary for producing panification.

Claim.

A process for the manufacture of gluten bread, consisting in dissolving a casein, rendered soluble, in tepid water, in adding salt, in allowing the solution to cool, in adding yeast and causing it to dissolve in the solution, in then kneading gluten flour, containing about 96% of gluten, with the mixture so as to form a dough, the casein and gluten being in the proportion of about 150 grams of casein to 500 grams of gluten, in allowing the dough to ferment, and then baking the dough.

The foregoing specification of my "Improvements in and relating to the manufacture of bread and the like" signed by me this 9th day of January 1903.

CHARLES ANTOINE HEUDEBERT.

Witnesses:
    AUGUSTUS E. INGRAM,
    MAURICE H. PIGNET.